United States Patent [19]

Pottinger

[11] Patent Number: 4,986,118
[45] Date of Patent: Jan. 22, 1991

[54] APPARATUS FOR MEASURING TIRE TREAD FORCE AND MOTION

[75] Inventor: Marion G. Pottinger, Akron, Ohio

[73] Assignee: The Uniroyal Goodrich Tire Company, Akron, Ohio

[21] Appl. No.: 487,575

[22] Filed: Mar. 2, 1990

[51] Int. Cl.$^5$ .......................................... G01M 17/02
[52] U.S. Cl. .................................... 73/146; 73/862.65
[58] Field of Search .............................. 73/146, 862.65

[56] References Cited

U.S. PATENT DOCUMENTS

| 2,313,156 | 3/1943 | Kratt, Jr. | 73/146 |
| 3,183,481 | 5/1965 | McCrory | 73/146 |
| 3,234,787 | 2/1966 | Ruge | 73/862.67 |
| 3,581,563 | 6/1971 | Christie et al. | 73/146 |
| 3,589,182 | 6/1971 | Burgett | 73/146 |
| 4,028,937 | 6/1977 | Crano | 73/146 |

FOREIGN PATENT DOCUMENTS 0855423  8/1981  U.S.S.R. ................................ 73/146

OTHER PUBLICATIONS

"Tire-Road Contact Pressure Sensors", by Precision Measurement Company.

Primary Examiner—Donald O. Woodiel
Attorney, Agent, or Firm—Barry L. Tummino; Alan A. Csontos; Greg Strugalski

[57] ABSTRACT

An apparatus is disclosed for measuring tire force and tire tread motion in a common area of a tire under test. The apparatus comprises a tire test block having a bearing surface over which a tire to be tested is rolled. A force sensor is received in an opening in the block and adapted to be engagable by the tire under test. The force sensor includes a longitudinally extending member having a longitudinally extending opening therein. The member has a central axis, the central axis being oriented substantially perpendicular to the bearing surface of the test block. The force sensor further includes strain gages secured to the member and having an electrical characteristic indicative of force applied to the member by the tire under test. A motion sensor is located within the longitudinally extending opening in the member. The motion sensor includes an elongated pin having a tip extending beyond the bearing surface of the test block so that the tip penetrates the tread of the tire under test as the tire rolls over the motion sensor. The motion sensor further includes strain gages secured to the pin and having an electrical characteristic indicative of the motion of the pin which is, in turn, indicative of the motion of the tread of the tire penetrated by the pin.

41 Claims, 2 Drawing Sheets

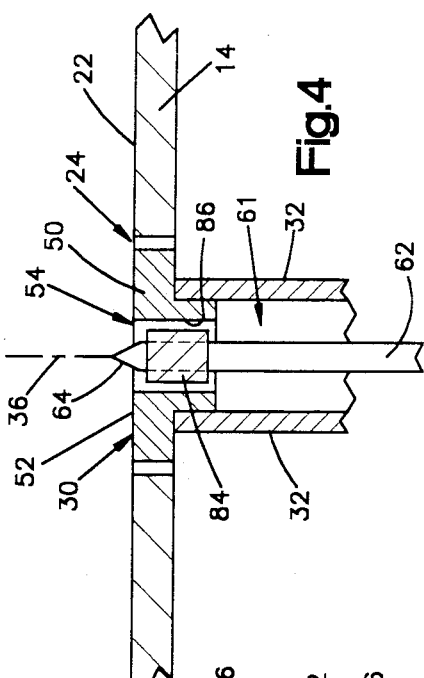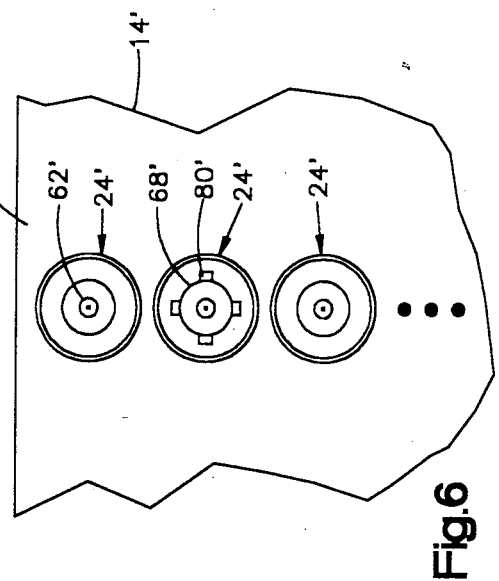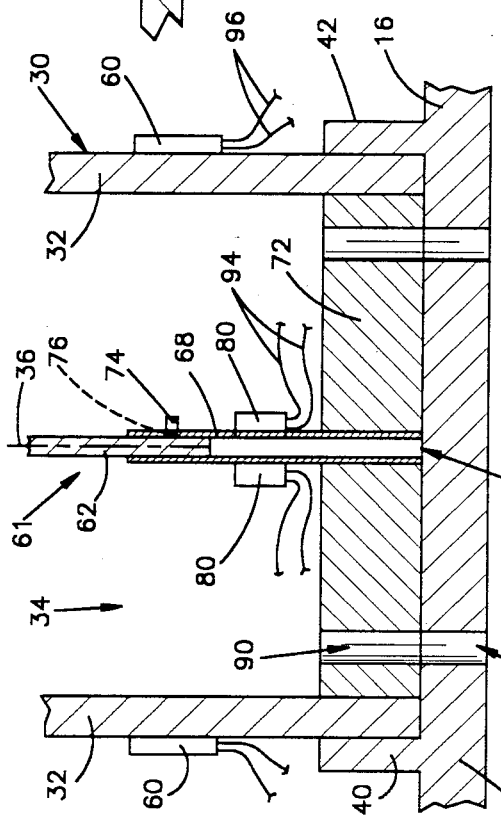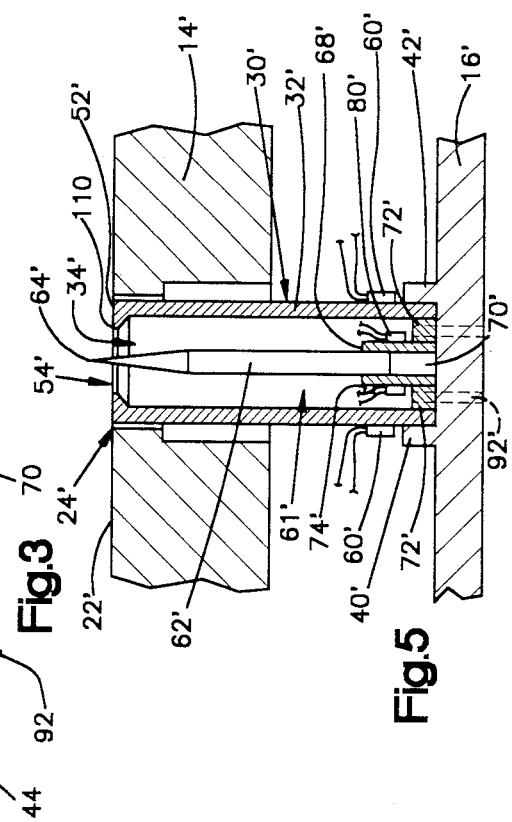

APPARATUS FOR MEASURING TIRE TREAD FORCE AND MOTION

TECHNICAL FIELD

The present invention is directed to an apparatus for testing tires and is particularly directed to an apparatus for measuring tire tread force and motion.

BACKGROUND ART

One goal of tire manufactures is to improve tire design to increase the life of the tire. One measure of a tire's life is, of course, tire tread wear as a function of driven miles. When a tire is manufactured in accordance with a new design, it is essential that the manufacturer test the new tire to predict tire tread wear. To test tire tread wear for a new tire design, manufacturer's would typically mount a set of tires made in accordance with the new design on a vehicle and drive the vehicle on a test track. After driving a predetermined number miles, the new tires would be removed from the vehicle, tread wear would be measured, and the tires remounted to the vehicle for further testing by driving. Since the test and measurement made on one set of tires is not statistically sufficient to make a prediction of tire tread wear of all such tires, this process must be repeated on many sets of the tires made in accordance with the new design. Such an approach for determining tire tread wear is costly and time consuming.

It has been discovered that tire tread wear is functionally related to (i) evenness of the tire's force and (ii) tire tread slip at the tire's contact patch. If a tire has uneven force and/or excess tread slip at the contact patch, such tire could be expected to wear unevenly during its use. Non-destructive testing methods and apparatus have been developed that permit a manufacture to measure tire force and tire tread slip at the tire contact patch. From these measured values, wear of the tire is predicted.

Known non-destructive test apparatus includes tire contact pressure sensors that measure tire contact pressure in the contact patch and provide an electrical signal having a characteristic indicative of the measured tire contact pressure. The tire's contact pressure is indicative of the tire's force. Such known test apparatus includes a bearing plate over which a tire to be test is rolled. A contact pressure sensor is provided and includes a solid, longitudinally extending member having stain gages operatively secured thereto. The contact pressure sensor is received in an opening in the bearing plate and adapted to be engagable by the tire being tested as the tire rolls across the bearing plate. The strain gages are arranged to simultaneously measure vertical contact pressure, fore-aft shear stress, and lateral shear stress. It is also known to mount a plurality of such tire contact pressure sensors in a linear array across the bearing plate so as to be oriented perpendicular to the direction of travel of the tire being tested.

Other known non-destructive test apparatus includes slip sensors that measure tire tread slip in a contact patch and provide an electrical signal having a characteristic indicative of the measured tire tread slip. Such known test apparatus includes a bearing plate over which a tire to be test is rolled. A slip sensor is provided and includes a pointed pin. The pointed pin is received in an opening in the bearing plate and is arranged so as to protrude slightly above the bearing surface. As the tire rolls over the pin, the pin point sensor embeds itself in the tire tread. The pin bends commensurate with the tread slip. Strain gages are mounted to the pin and arranged so as to provide an electrical signal having a characteristic indicative of of the amount of tread slip.

Electronic circuitry or data acquisition equipment is used to collect data from tire contact pressure and/or tire tread slip sensors for later analysis and prediction of tire wear Such circuitry or data acquisition equipment is well known in the strain gage art.

The problem with known prior art non-destructive test apparatus is that the tire contact pressure sensors and the tire tread slip sensors are spaced a finite distance apart on the bearing block. Although both sensors measure tire contact pressure and tire tread slip in the same tire, the points of measurement on the tire under test are spaced apart. It has been found desirable to know both the tire contact pressure and the tire tread slip at common test points on the tire surface.

SUMMARY OF THE PRESENT INVENTION

The present invention provides an apparatus for measuring tire force and tire tread motion in a common area of a tire under test. The apparatus provides force sensing means mounted in an opening in a test block over which a tire to be tested is run. The force sensing means has a central opening therein. Motion sensing means is mounted in the opening of the force sensing means so that the two sensing means are essentially coaxial. The force sensing means and the motion sensing means have electrical characteristics indicative of the tire force and tread motion, respectively.

In accordance with the present invention, the apparatus comprises a tire test block having a bearing surface over which a tire to be tested is rolled. Force sensing means are received in an opening in the block and adapted to be engagable by the tire under test. The force sensing means includes a longitudinally extending member having a longitudinally extending opening therein. The member has a central axis oriented substantially perpendicular to the bearing surface of the test block. The force sensing means further includes force measuring means secured to the member. The force measuring means has an electrical characteristic indicative of force applied to the member by the tire under test. The apparatus further includes motion sensing means located within the longitudinally extending opening in the member. The motion sensing means includes an elongated pin having a tip extending beyond the bearing surface of the test block so that the tip penetrates the tread of the tire under test as the tire rolls over the motion sensing means. The motion sensing means further includes motion measuring means secured to the pin and having an electrical characteristic indicative of the motion of the pin which is, in turn, indicative of the motion of the tread of the tire penetrated by the pin.

In accordance with a preferred embodiment of the present invention, an apparatus is provided for measuring tire force and tire tread motion in a common area of a tire under test. The apparatus comprises a tire test block including a top plate, the top plate having a bearing surface over which a tire to be tested is rolled and having an opening. The test block further includes a bottom mounting plate and means to retain said bottom plate spaced away from said top plate. The apparatus further includes force sensing means received in the opening in the top plate and secured to the bottom plate. The force sensing means is adapted to be engagable by the tire under test. The force sensing means further includes a longitudinally extending member having one end secured to the bottom plate and the other end extending in the opening in the top plate. The member has a longitudinally extending opening therein and a central axis, the central axis being oriented substantially perpendicular to the bearing surface of the top plate of the test block. The force sensing means further includes force measuring means secured to the member and having an electrical characteristic indicative of force applied to the member by the tire under test. The apparatus further includes motion sensing means located within the longitudinally extending opening in the member. The motion sensing means includes an elongated pin having one end secured to the bottom plate and the other end of the elongated pin having a tip extending beyond the bearing surface of the test block so that the tip penetrates the tread of the tire under test as the tire rolls over the motion sensing means. The motion sensing means further includes motion measuring means secured to the pin and having an electrical characteristic indicative of the motion of the pin which is, in turn, indicative of the motion of the tread of the tire penetrated by said pin. The force measuring means preferably includes strain gages operatively secured to the sides of the member and measure contact pressure exerted by the tire. Means are provided to restrain the movement of the motion sensing means to a maximum predetermined amount relative to the force sensing means. In one preferred embodiment, the means to restrain the movement of motion sensing means is secured to said pin. In another embodiment, the means to restrain the movement of the motion sensing means is secured to the force sensing means. The motion measuring means preferably includes strain gauges operatively secured to the sides of the pin.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which:

FIG. 3 is a side sectional view along line 3—3 of FIG. 2;

FIG. 4 is a side sectional view of a part of the force sensor and motion sensor shown in FIG. 2 depicting one motion sensor restraint arrangement in accordance with the present invention;

FIG. 5 is a side sectional view of a part of the force sensor and motion sensor in accordance with another aspect of the present invention; and FIG. 6 is a top plane view of the upper bearing surface test block made in accordance with another aspect of the present invention.

DETAILED DESCRIPTION

Figure 1:
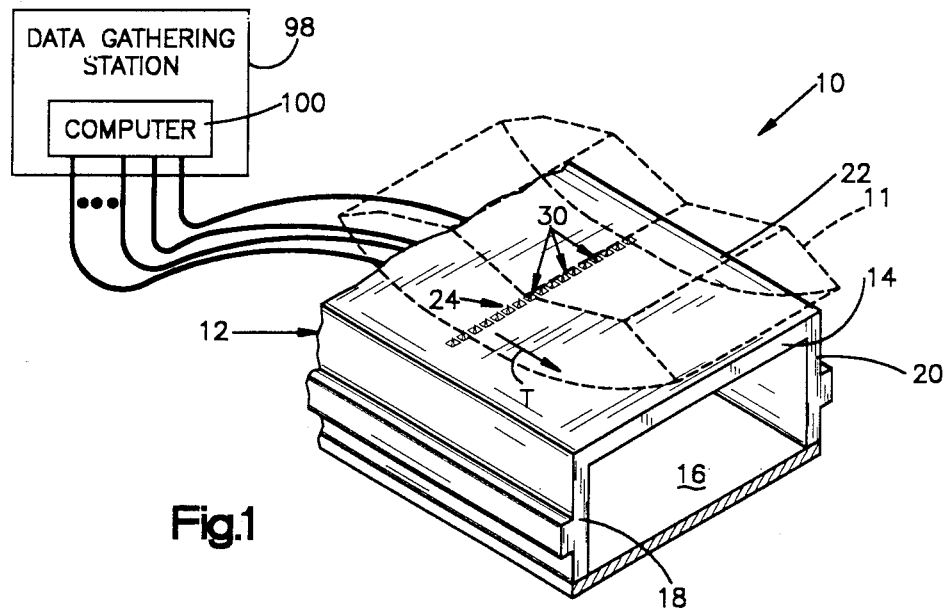
FIG. 1 is a schematic perspective view, partially in section, of a tire test block made in accordance with the present invention.

Referring to FIG. 1, an apparatus 10 is shown for measuring tire force and tire tread motion in a tire 11. The apparatus 10 includes a test block 12 having a top plate 14 and a bottom plate 16. The top plate 14 has side walls 18, 20 integrally attached thereto. The bottom plate 16 is secured to the side walls 18, 20 by appropriate means such as by welding or bolts. The bottom plate 16 is retained a fixed distance away from the top plate 14 by the side walls 18, 20.

The top plate 14 has an upper bearing surface 22 over which a tire to be tested is rolled. The top plate 14 has an elongated opening 24 that is arranged so as to be substantially perpendicular to the direction of travel T of tires being tested. The length of the elongated opening 24 is preferably greater than the width of the widest tire expected to be tested.

Figure 2:
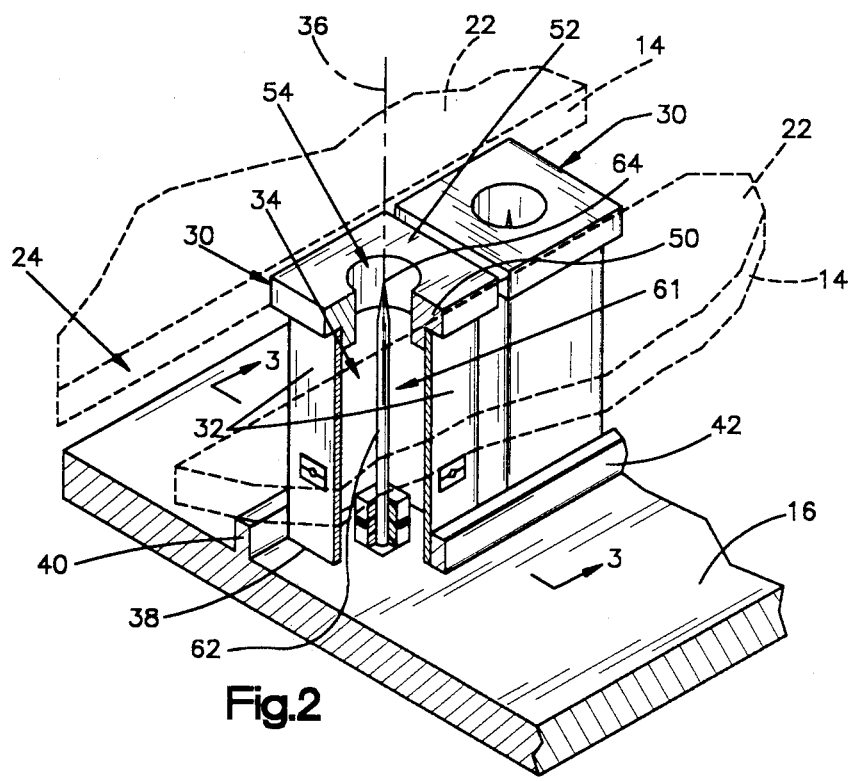
FIG. 2 is a schematic perspective view, partially in section of a portion of the tire test block shown in FIG. 1 with certain parts removed for clarity.

Referring to FIGS. 2-4, a plurality of force sensing devices 30 are received in the elongated opening 24. Each of the force sensing devices 30 are identical in structure. For the purposes of discussion, only one force sensing device 30 is described in detail. The force sensing device 30 includes four side members 32 attached together. The side members 32 define a longitudinally extending opening 34. A central axis 36 runs through the opening 34. A cross section through the side members 32 at an angle perpendicular to the side members 32 and the central axis 36 would substantially define a square.

One end 38 of the members 32 is attached to the bottom plate 16 such as by welding. The bottom plate 16 includes spaced apart side walls 40, 42 preferably integrally formed therewith so as to extend substantially perpendicular from the main body 44 of the bottom plate 16. The side walls 40, 42 are spaced apart by an amount slightly greater than the spacing between the side walls 32 of the force sensor 30 so as to provide structural support for the force sensor 30.

The force sensing device 30 further includes a top tire contact plate 50 having a tire bearing surface 52. The contact plate 50 is attached to the side members 32 by an appropriate means. The contact plate 50 has a central opening 54 that communicates with the opening 34 defined by the members 32. The bearing surface 52 of the tire contact plate 50 is preferably coplanar with the bearing surface 22 of the top plate 14.

Force measuring devices 60 are operatively attached to the side members 32 so that each side member 32 has an associated force measuring device 60. Each of the force measuring devices 60 is of the type that has an electrical characteristic that varies as a function of the force to which its associated side member 32 is subjected. Preferably, the force measuring devices 60 are resistive strain gages having an impedance that varies as a function of the force to which its associated side member 32 is subjected.

Each force sensing device 32 has an associated tire tread motion sensor 61 centrally mounted in its associated opening 34. Each motion sensor 61 is identically constructed. For simplicity in explanation, only one motion sensor 61 is described in detail. The motion sensor 61 includes a pin 62 having a pointed end 64.

A pin holding member 68 is secured in a bore 70 of a pin base plate 72. The base plate 72 is secured to the bottom plate 16 by an appropriate means such as by gluing. The pin holding member 68 is preferably located so as to retain the pin 62 along the central axis 36. The pin holding member 68 has a locking screw 74 threadably received in a bore 76. The pin is telescopically received in the pin holding member 68 and is fixed therein by means of the locking screw 74 being tightened against the pin 62. The axial height of the pin 62 is adjusted relative to the bottom plate 16 so that the pointed end 64 of the pin 62 extends through the opening 54 and beyond the bearing surface 52 of the tire contact plate 50 and beyond the bearing surface 22 of the top plate 14. After the height of the pin is properly adjusted, it is locked in position with the locking screw 74.

The pin 62 is manufactured from a relatively stiff material such as steel. The pin holding member 68 is made of material such as steel but has walls sufficiently thin as to allow motion of the pin 62. A motion measuring device 80 is operatively secured to sides of the pin holding member. Each motion measuring device has an electrical characteristic that varies as a function of the motion of the pin 62. Preferably, each of the motion measuring devices are resistive strain gages having an impedance value indicative of the motion of the pin 62.

A travel limit block 84 is secured to the pin 62 so as to be axially aligned in the opening 54 of the tire contact plate 50. The travel limit block 84 limits the motion of the pin 62 by the block 84 contacting the side walls 86 defining the opening 54.

The base plate 72 and the bottom plate 16 have co-aligned bores 90, 92, respectively, for passage of electrical connection wires 94 from the motion measuring devices 80. Electrical connection wires 96 for the force measuring devices 60 pass between the upper plate 14 and the bottom plate 16. Electrical connections from all of the force measuring devices 60 and the motion measuring devices are made to a data gathering station 98 that typically includes a computer 100 that processes and analysis the received data.

When a tire is to be tested, it is mounted in a yoke arrangement, not shown, of a type well known in the art. The tire is rolled in the direction T across the test block with a predetermined amount of force applied to the tire in a direction toward and perpendicular to the test block. As the tire rolls over the elongated slot 24, the tire force or contact pressure is measured at each of the force sensor locations. Also, each of the motion sensor pins penetrates into the tire tread. The motion of the tread at each of the locations is measured by the associated motion sensor. The coaxial arrangement of the force sensor and the motion sensor permits a measurement of both the tire force and the tread motion at common points at a plurality of locations.

Referring to FIGS. 5 and 6, another embodiment of the present invention is shown. In this embodiment, the force measuring sensor 30' has a cylindrical member 32' and has its one end received in an associated cylindrical opening 24' in the top plate 14'. The cylindrical member has an opening 34'. A bearing surface 52' of the sensor 30' is coplanar with a bearing surface 22' of the top plate 14'. The sensor 30' has a cylindrical opening 54' at one end. The other end of the sensor 30' is attached to the bottom plate 16' between side walls 42'.

A motion sensor 61' includes a pin 62' telescopically received and secured in a pin holder 68' both of which are located in the opening 34' of the cylindrical member 32. A set screw 74' holds the pin 62' in its adjusted position. The end 64' of the pin extends beyond the bearing surface 52' so as to be able to penetrate the tire tread as the tire rolls over the test block.

The pin holder 68' is received in a bore 70' of a base plate 72'. The outer diameter of the base plate 72' is cylindrical so as to match the inner wall surface of the cylindrical member 32'. The base plate 72' and pin holder 68' are secured to the bottom plate 16' by an appropriate means. A plurality of motion measuring devices 80' are operatively secured to the pin holder 68' and have an electrical characteristic that varies as a function of the motion of the pin 62'. Wires connected to the motion measuring devices 80' are fed through bores 92' in the base plate 72' and the bottom plate 16'. A plurality of force measuring devices 60' are operatively secured to the walls 32' and have an electrical characteristic that varies as a function of the force applied to the bearing surface 52'. The motion measuring devices 80' and the force measuring devices 60' are preferably resistive strain gages and are connected to a computer for data gathering and analysis as described above.

The cylindrical member 32' of the force sensor 30' includes an inwardly directed flange portion 110. The inwardly directed flange is used to limit the amount of deflection of the motion sensing pin 62'. It has been found that a pin of diameter 0.031 inches with a conical end and an opening of the upper portion of the cylindrical member 32' of 0.101 inches permits a maximum pin deflection of 0.050 inches which provides good measurement results. Also, it has been discovered that a cylindrical member having an outer diameter of 0.196 inches received in an opening 24' having a diameter of 0.202 inches provides good measurement results. It has also been discovered that a spacing between adjacent motion sensor pins 62' of 0.300 inches provides good measurement results of tire force and tread motion. These dimensions yield that the ratio of the motion pin diameter to the maximum deflection is 0.031/0.050 or 0.62. The ratio of the pin diameter to the diameter of the opening in the cylindrical member through which the pin extends is 0.031/0.101 or 0.31. The ratio of the cylindrical member diameter to the diameter of the opening in the upper plate is 0.196/0.202 or 0.97.

The pin mounting arrangement of the present invention with the set screw 74 and the hollow pin holder 68 allows for ease in adjustment of the pin height and also for ease in replacement of the pin 62 should it become worn or broke.

This invention has been described with reference to preferred embodiments. Modifications and alterations may occur to others upon reading and understanding this specification. It is my intention to include all such modifications and alterations insofar as they come within the scope of the appended claims and the equivalents thereof.

Having fully described my invention, I claim:

1. An apparatus for measuring tire force and tire tread motion in a common area of a tire under test, said apparatus comprising:

tire test block having a bearing surface over which a tire to be tested is rolled;

force sensing means received in an opening in said block and adapted to be engagable by the tire under test, said force sensing means including a longitudinally extending member and a longitudinally extending opening in said member, said member having a central axis, said central axis being oriented substantially perpendicular to said bearing surface of said test block, said force sensing means further including force measuring means secured to said member and having an electrical characteristic indicative of force applied to said member by the tire under test; and motion sensing means located within said longitudinally extending opening in said member, said motion sensing means including an elongated pin having a tip extending beyond said bearing surface of said test block so that said tip penetrates the tread of the tire under test as the tire rolls over said motion sensing means, said motion sensing means further including motion measuring means secured to said pin and having an electrical characteristic indicative of the motion of said pin which is, in turn, indicative of the motion of the tread of the tire penetrated by said pin.

2. The apparatus of claim 1 wherein said longitudinally extending member comprises at least four, longitudinally extending side walls joint together to form a square structure.

3. The apparatus of claim 2 wherein said force measuring means include four strain gages operatively secured to said side walls, each side wall having an associated strain gage.

4. The apparatus of claim 1 wherein said force measuring means includes strain gages operatively secured to the sides of said member.

5. The apparatus of claim 1 further including means to restrain the movement of said motion sensing means to a maximum predetermined deflection.

6. The apparatus of claim 5 wherein said means to restrain the movement of said motion sensing means is secured to said pin.

7. The apparatus of claim 5 wherein said means to restrain the movement of said motion sensing means is secured to said force sensing means.

8. The apparatus of claim 5 wherein said motion sensing means is a cylindrical pin and wherein the ratio of the diameter of the pin to the maximum pin deflection is approximately 0.62.

9. The apparatus of claim 5 wherein said motion sensing means in a cylindrical pin, wherein said longitudinally extending opening in said force sensing means is cylindrical in shape, and wherein the ratio of the diameter of the pin to the diameter of the longitudinally extending opening near its end where the pin extends therethrough is approximately 0.31.

10. The apparatus of claim 1 wherein said longitudinally extending member is cylindrical in shape.

11. The apparatus of claim 10 wherein said force measuring means includes at least four strain gages operatively connected to the sides of said cylindrically shaped member.

12. The apparatus of claim 1 wherein said motion measuring means includes strain gages operatively secured to the sides of said pin.

13. The apparatus of claim 1 wherein said motion sensing means further includes a hollow pin holder mounted to said test block and having a set screw, said pin being received in said pin holder and held in position by said set screw.

14. An apparatus for measuring tire force and tire tread motion in a plurality of common areas of a tire under test, said apparatus comprising:
tire test block having a bearing surface over which a tire to be tested is rolled;
a plurality of force sensing means, each force sensing means received in an associated opening in said block and adapted to be engagable by the tire under test, each said force sensing means including a longitudinally extending member and a longitudinally extending opening in said member, said member having a central axis, said central axis being oriented substantially perpendicular to said bearing surface of said test block, each said force sensing means further including associated force measuring means secured to its associated member and having an electrical characteristic indicative of force applied to its associated member by the tire under test; and
a plurality of motion sensing means, each force sensing means having an associated motion sensing means located within its said longitudinally extending opening of its member, each said motion sensing means including an elongated pin having a tip extending beyond said bearing surface of said test block so that said tip penetrates the tread of the tire under test as the tire rolls over its associated motion sensing means, each said motion sensing means further including motion measuring means secured to its associated pin and having an electrical characteristic indicative of the motion of its associated pin which is, in turn, indicative of the motion of the tread of the tire penetrated by its associated pin.

15. The apparatus of claim 14 wherein each said longitudinally extending member comprises at least four, longitudinally extending side walls joint together to form a square structure.

16. The apparatus of claim 15 wherein each said force measuring means includes four strain gages operatively secured to its associated side walls, each side wall having an associated strain gage.

17. The apparatus of claim 14 wherein each said force measuring means includes strain gages operatively secured to the sides of its associated member.

18. The apparatus of claim 14 further including means to restrain the movement of each said motion sensing means to a maximum predetermined amount of deflection.

19. The apparatus of claim 18 wherein said motion sensing means is a cylindrical pin and wherein the ratio of the diameter of the pin to the maximum deflection is approximately 0.62.

20. The apparatus of claim 18 wherein each means to restrain the movement of associated motion sensing means is secured to their associated pin.

21. The apparatus of claim 18 wherein each means to restrain the movement of associated motion sensing means is secured to their associated force sensing means.

22. The apparatus of claim 21 wherein said motion sensing means is a cylindrical pin, wherein said longitudinally extending opening in said force sensing means is cylindrical in shape, and wherein the ratio of the diameter of the pin to the diameter of the longitudinally extending opening near its end where the pin extends therethrough is approximately 0.31.

23. The apparatus of claim 14 wherein each longitudinally extending member is cylindrical in shape.

24. The apparatus of claim 23 wherein each force measuring means includes at least four strain gages operatively connected to the sides of their associated cylindrically shaped member.

25. The apparatus of claim 14 wherein each said motion measuring means includes strain gages operatively secured to the sides of their associated pin.

26. The apparatus of claim 14 wherein the plurality of openings in said test block are arranged so that they are substantially perpendicular to an intended path of travel of the tire under test.

27. The apparatus of claim 14 wherein said plurality of elongated pins are spaced approximately 0.3 inches apart from adjacent pins.

28. The apparatus of claim 14 wherein each said motion sensing means further includes a hollow pin holder mounted to said test block and having a set screw, the associated pin of a motion sensing means being received in its associated pin holder and held in position by said set screw.

29. An apparatus for measuring tire force and tire tread motion in a common area of a tire under test, said apparatus comprising:

tire test block including a top plate, said top plate having a bearing surface over which a tire to be tested is rolled and having an opening, said test block further including a bottom mounting plate and means to space said bottom plate away from said top plate;

force sensing means received in said opening in said top plate and secured to said bottom plate, said force sensing means adapted to be engagable by the tire under test, said force sensing means including a longitudinally extending member, one end of said member secured to said bottom plate and the other end of said member extending in said opening in said top plate, said member having a longitudinally extending opening therein, said member having a central axis, said central axis being oriented substantially perpendicular to said bearing surface of said top plate of said test block, said force sensing means further including force measuring means secured to said member and having an electrical characteristic indicative of force applied to said member by the tire under test; and motion sensing means located within said longitudinally extending opening in said member, said motion sensing means including an elongated pin having one end secured to said bottom plate and the other end of the elongated pin having a tip extending beyond said bearing surface of said test block so that said tip penetrates the tread of the tire under test as the tire rolls over said motion sensing means, said motion sensing means further including motion measuring means secured to said pin and having an electrical characteristic indicative of the motion of said pin which is, in turn, indicative of the motion of the tread of the tire penetrated by said pin.

30. The apparatus of claim 29 wherein said longitudinally extending member comprises at least four, longitudinally extending side walls joint together to form a square structure.

31. The apparatus of claim 30 wherein said force measuring means include four strain gages operatively secured to said side walls, each side wall having an associated strain gage.

32. The apparatus of claim 29 wherein said force measuring means includes strain gages operatively secured to the sides of said member.

33. The apparatus of claim 29 further including means to restrain the movement of said motion sensing means to a maximum predetermined amount of deflection.

34. The apparatus of claim 33 wherein said motion sensing means is a cylindrical pin and wherein the ratio of the diameter of the pin to the maximum deflection is approximately 0.62.

35. The apparatus of claim 33 wherein said means to restrain the movement of said motion sensing means is secured to said pin.

36. The apparatus of claim 33 wherein said means to restrain the movement of said motion sensing means is secured to said force sensing means.

37. The apparatus of claim 36 wherein said motion sensing means is a cylindrical pin, wherein said longitudinally extending opening in said force sensing means is cylindrical in shape, and wherein the ratio of the diameter of the pin to the diameter of the longitudinally extending opening near its end where the pin extends therethrough is approximately 0.31.

38. The apparatus of claim 29 wherein said longitudinally extending member is cylindrical in shape.

39. The apparatus of claim 38 wherein said force measuring means includes at least four strain gages operatively connected to the sides of said cylindrically shaped member.

40. The apparatus of claim 29 wherein said motion measuring means includes strain gages operatively secured to the sides of said pin.

41. The apparatus of claim 29 wherein said motion sensing means further includes a hollow pin holder mounted to said test block and having a set screw, said pin being received in said pin holder and held in position by said set screw.

* * * * *